US010588435B2

(12) United States Patent
Bergeron et al.

(10) Patent No.: US 10,588,435 B2
(45) Date of Patent: Mar. 17, 2020

(54) PORTABLE ADJUSTABLE EASEL METHOD AND APPARATUS

(71) Applicants: Lynette Lapriel Bergeron, Lebanon, OR (US); Jacqualyn Marlene Pendleton, Lebanon, OR (US)

(72) Inventors: Lynette Lapriel Bergeron, Lebanon, OR (US); Jacqualyn Marlene Pendleton, Lebanon, OR (US)

( * ) Notice: Subject to any disclaimer, the term of this patent is extended or adjusted under 35 U.S.C. 154(b) by 0 days.

(21) Appl. No.: 15/582,692

(22) Filed: Apr. 30, 2017

(65) Prior Publication Data

US 2017/0311722 A1    Nov. 2, 2017

Related U.S. Application Data

(60) Provisional application No. 62/330,685, filed on May 2, 2016.

(51) Int. Cl.
| | |
|---|---|
| *A47B 97/04* | (2006.01) |
| *A47G 1/16* | (2006.01) |
| *A47B 23/04* | (2006.01) |
| *A47F 7/14* | (2006.01) |
| *A47G 1/14* | (2006.01) |
| *F16M 13/02* | (2006.01) |
| *F16M 13/00* | (2006.01) |
| *F16M 11/04* | (2006.01) |
| *F16M 11/38* | (2006.01) |

(52) U.S. Cl.
CPC .............. *A47G 1/16* (2013.01); *A47B 23/043* (2013.01); *A47B 97/04* (2013.01); *A47F 7/142* (2013.01); *A47G 1/142* (2013.01); *F16M 11/041* (2013.01); *F16M 11/38* (2013.01); *F16M 13/00* (2013.01); *F16M 13/022* (2013.01)

(58) Field of Classification Search
CPC .. A47F 5/10; A47F 7/142; A47G 1/16; A47G 2001/1673; A47B 97/08; A47B 23/043
USPC .... 248/441.1, 442, 448, 451, 473, 488, 452, 248/455, 457
See application file for complete search history.

(56) References Cited

U.S. PATENT DOCUMENTS

| | | | | | |
|---|---|---|---|---|---|
| 1,040,066 | A | * | 10/1912 | Washburn | A47B 97/08 248/449 |
| 1,040,067 | A | * | 10/1912 | Washburn | A47B 97/08 211/44 |
| 2,554,559 | A | * | 5/1951 | Chadwell | G09F 1/14 211/51 |
| 2,896,364 | A | * | 7/1959 | McCollister | A47B 23/007 248/445 |
| 3,278,150 | A | * | 10/1966 | Pedee | A47B 97/08 248/456 |

(Continued)

*Primary Examiner* — Gwendolyn W Baxter

(57) ABSTRACT

An adjustable easel support apparatus and method for forming. The easel support apparatus has selected adjustment features facilitating options of supporting an object. As a table easel, the support posts of the apparatus standing in an upright position and connected to a rigid material, can be adjusted up or down to a desired slant. Users of the table easel could be calligraphers, artists, illustrators, painters, not excluding others. Removable legs of the apparatus further reduce the angle of an attached rigid material providing another alternative slope. The removable legs could have protective non-skid product applied to enhance immovability in either position stabilizing against sliding and pivotal movement. The apparatus is small, portable and light weight.

7 Claims, 5 Drawing Sheets

(56) References Cited

U.S. PATENT DOCUMENTS

| | | | | |
|---|---|---|---|---|
| 3,408,032 | A | * | 10/1968 | Francis ................ A47B 23/007 248/447.1 |
| 4,378,102 | A | * | 3/1983 | Portis, Jr. ............. A47B 23/044 248/165 |
| 4,508,307 | A | * | 4/1985 | Morales ............... A47B 23/043 248/448 |
| 4,703,569 | A | * | 11/1987 | Bowman ................ G09F 15/02 40/745 |
| 6,202,973 | B1 | * | 3/2001 | Navarin ............... A47B 23/002 248/441.1 |
| 6,351,904 | B1 | * | 3/2002 | Hermanson ............. G09F 13/02 40/559 |

* cited by examiner

PORTABLE ADJUSTABLE EASEL METHOD AND APPARATUS

CROSS-REFERENCES TO RELATED APPLICATIONS

This application claims priority to U.S. Provisional Patent Application Ser. No. 62/330,685 filed on May 2, 2016 entitled "Portable Adjustable Easel Method and Apparatus", the disclosure of which is hereby incorporated by reference.

FIELD OF THE INVENTION

The present invention relates to easels and the like, and more specifically, to such devices which are compactly built for ease of carry and storage, and which may also employ adjustable attachments.

BACKGROUND OF THE INVENTION

Easels and other free-standing devices allow users to mount or attach artist tools or material such as clear acrylic board, wooden board, canvas and the like, allowing the user to design and create products of their craft be it calligraphy, water color, oil paintings and not discounting similar endeavors in the arts.

Prior art specifies a conventional practice for calligraphers to execute the art of writing, illuminating and lettering on a slanted frame or box. Floor or table standing easels, commonly constructed of tubular and other structural components which may be of wood, metal, plastic, cardboard or other materials, or combination thereof, have long been used for such applications. These devices can be relatively expensive, cumbersome, and difficult to use, and some have been designed to be more or less foldable, to make them less bulky for transport.

Traditionally, easels employ three or more legs which are attached via a hinging connector system, forming a structural triangle. This allows the easel to impart any weighted vertical forces placed onto an item-supporting cross member into an outward direction to the center of the structure. The hinged connectors contain expanding legs to prevent the easel legs from spreading, and as such, keep the easel upright. These traditional free-standing easels are steadfast in their construction and stability, but can only be as compact as the constituent pieces.

Another embodiment of the art sees a flat sheet of stiff, bendable, resilient plastic which forms a preferably rectangular, central panel and a pair of substantially triangular side sections (referred to as "wings"). The wings having bottom edges which preferably extend upwardly at a small angle relative to the bottom edge of the panel. The sheet is scored or otherwise weakened along the joint line extending along the junction of each wing and the panel, so that the wings can be folded rearward to adopt a generally perpendicular position relative to the panel. In this position, the angled bottom edges of the wings cause the panel to adopt a rearward inclined and upstanding position, thus being non-adjustable.

Another embodiment of the art sees the sheet having a pair of partial cutouts, preferably being bell-shaped and having a central slit in the upper end. Each cutout bridges a wing and the panel at a joint line, the cutout being integral with the panel along a joinder line extending along the cutout's bottom edge. The cutout may be bent rearward to engage the adjacent wing to lock it in the supporting position.

Again, another embodiment sees the sheet further having a second pair of partial cutouts of hook-like configuration formed in the panel adjacent its bottom edge in laterally spaced relationship. Each such hook-like cutout has a shank segment integral at its end with the panel and parallel with the panel's bottom edge, and a hook segment extending upwardly therefrom. The hook-like cutouts can thus be bent forwardly out of the panel to suspend and hold the preferred item so that it rests against the panel in an upwardly and rearwardly leaning position.

Another embodiment offers a three-hinged wooden frame structure featuring a tri-fold method to position a clear acrylic board, wooden board or other similar panel for calligraphers to execute the art of writing, illuminating and lettering on a slant. These frame structures provide pre-determined angles of slope that are non-adjustable and can be relatively expensive, cumbersome and difficult to use, transport, and store.

In conclusion, researched prior art materials and construction identified do not compare to the unique design of the present invention, it's compact size when not in use, and the invention's pairing with tall, short, skinny, or wide rigid material.

BRIEF SUMMARY OF THE INVENTION

According to the present invention and forming a primary objective thereof, an adjustable easel support apparatus and method for forming. The invention has selected adjustment features facilitating maximum ease of supporting a rigid material.

An object of the present invention is to provide a method for manufacturing support posts that adjustably support a rigid material creating an easel method.

A more particular object is to provide an easel support apparatus having an adjustable mechanism so that a user can manipulate a rigid material up or down achieving a comfortable, useful slant or angle upon which to work.

Another object is to provide a pair of support posts of the type described herein which have adjustable means for facilitating width adjustments of an object supported by the support posts wherein the support posts can hold rigid material of varying size.

These and other objects and features of the invention will become more apparent from the following description taken in connection with the accompanying drawings. It should be noted that any number or combination of the components described herein can be used in various embodiments of the present invention. The functions, features, and purposes of the aforementioned components will be discussed further in the following Detailed Description of the Invention.

REFERENCE NUMERALS IN DRAWINGS

Figure 1:
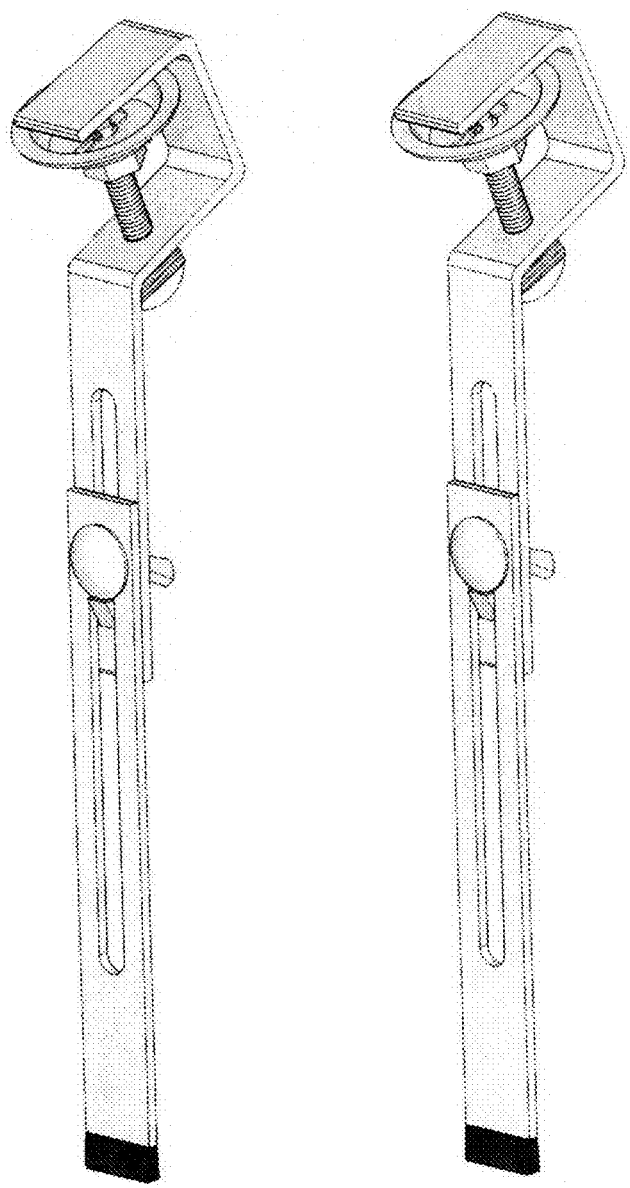
FIG. 1 is the upright view of the two parallel support posts characterizing the adjustable easel support apparatus as they would stand partially extended and ready to attach to a rigid material.

14 Top Plate
16 Tapped Hole
18 Thumbscrew
20 Wing Nut
22 Flat Washer
24 Bent Metal Tab
26 Bottom Plate
27 Center Slot in Bottom Plate
28 Protective Non-skid Product
30 Carriage Bolt
32 Center Slot in Top Plate
34 Cotter Key
36 Cupped Washer
38 Lock Nut
40 Hole in end of Thumbscrew

DETAILED DESCRIPTION OF THE INVENTION

In the following detailed Description, reference is made to specific embodiments in which the invention may be assembled and used by those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed Description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method, system, and apparatus include the discussed feature, advantage or mode of operation. The following Description of the preferred embodiment is merely exemplary in nature and is in no way intended to limit the invention, its application, or use.

There has thus been broadly outlined the more important features of the invention in order that the detailed Description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

With particular reference to the included Figs., an embodiment of the present invention generally comprises an apparatus of two support posts, each consisting of a top plate 14, a bottom plate 26, and a plurality of fasteners that secure the apparatus and allow for its adjustment. More specifically, an embodiment of the present invention may comprise an adjustable support post that is formed from one or more of the following: pieces of steel or other similar material that are cut to a length that form a top plate 14 and a bottom plate 26, and various fasteners.

Figure 2:
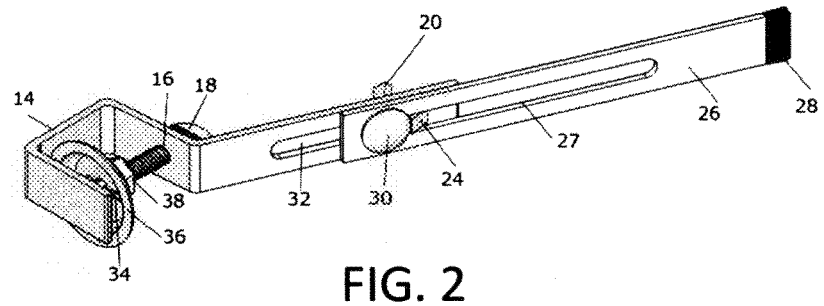
FIG. 2 is a perspective view of a single support post of the invention in an assembled extended display position, with part reference numbers.
Figure 3:
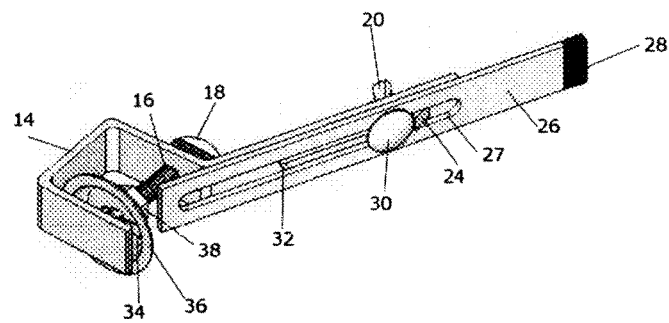
FIG. 3 is a perspective view of a single support post of the invention assembled in a shortened display position, with part reference numbers.
Figure 4:
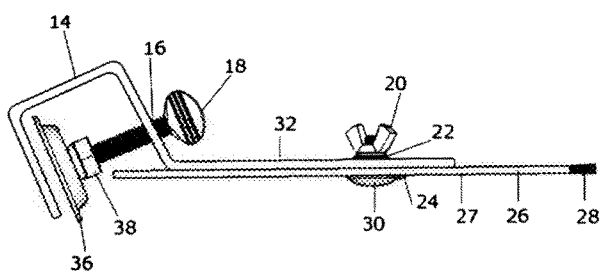
FIG. 4 is a side view of a single support post of the invention assembled and ready to attach to a panel, hardboard or acrylic writing surface, showing individual components for clarity, with part reference numbers.
Figure 5:
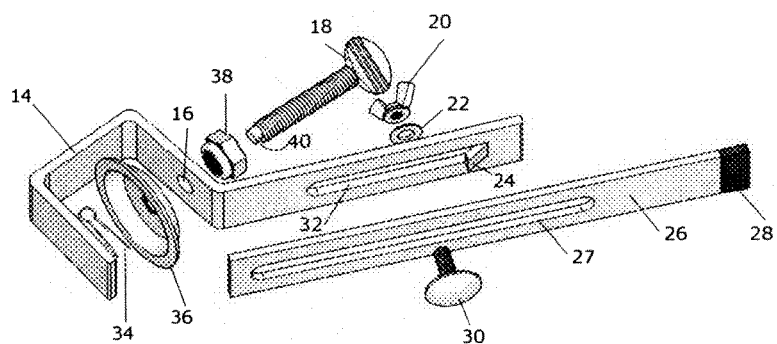
FIG. 5 is an exploded view of a single support post of the invention showing individual components for clarity, with part reference numbers.
Figure 6:
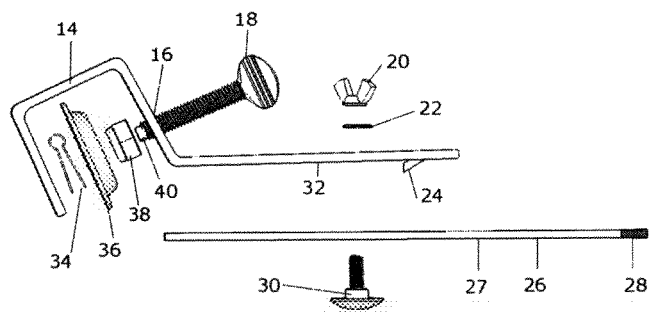
FIG. 6 is a side view of a single support post depicting some parts disassembled with part reference numbers, of the invention. This view shows how the invention is assembled, portions being broken away and showing individual components for clarity, with part reference numbers.
Figure 7:
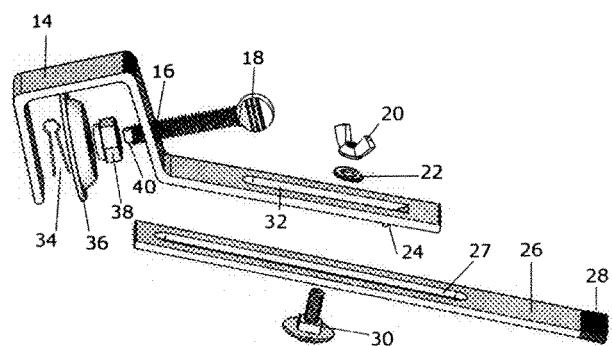
FIG. 7 is a perspective view of a single support post of the invention, portions being broken away and showing individual components for clarity, with part reference numbers.
Figure 8:
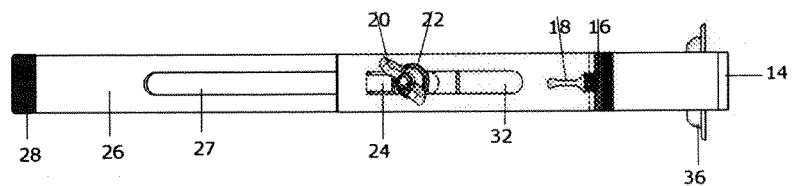
FIG. 8 is a top view of a single support post of the invention assembled with part reference numbers of visible parts, showing individual components for clarity, with part reference numbers.
Figure 9:
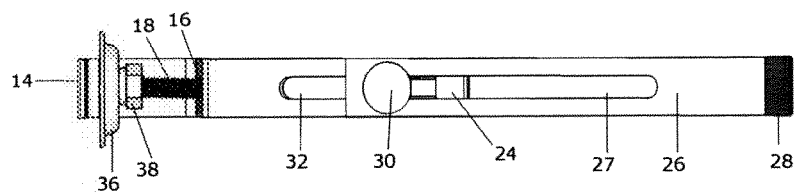
FIG. 9 is a bottom view of a single support post of the invention assembled with part reference numbers of visible parts, showing individual components for clarity, with part reference numbers.
Figure 10:
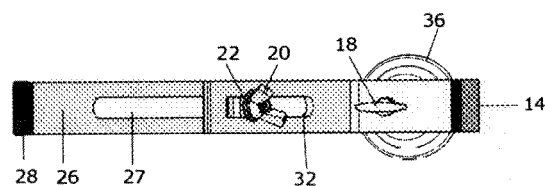
FIG. 10 is a top view of a single support post of the invention assembled with part reference numbers of visible parts, showing individual components for clarity, with part reference numbers.
Figure 11:
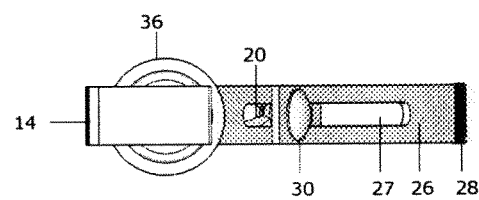
FIG. 11 is a bottom view of a single support post of the invention assembled with part reference numbers of visible parts, showing individual components for clarity, with part reference numbers.
Figure 12:
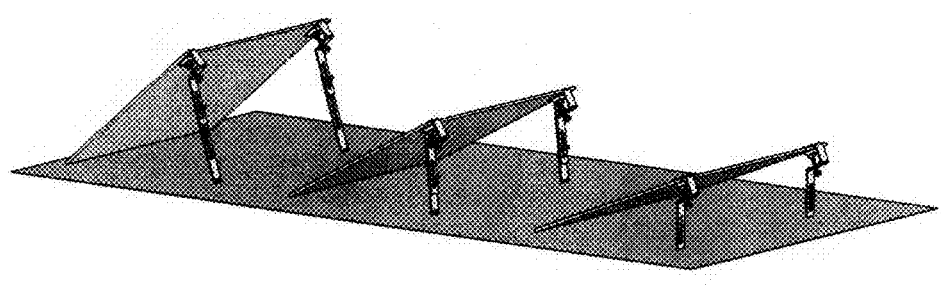
FIG. 12 is an illustration of the adjustability of the two support posts when clamped on a hardboard and resting on a tabletop. The illustration depicts a sample of three different heights, other degrees of height not to be discounted. On the left is a moderate extension of the supports, in the center is a shortened extension of the supports and the right side shows the bottom plate removed.
Figure 13:
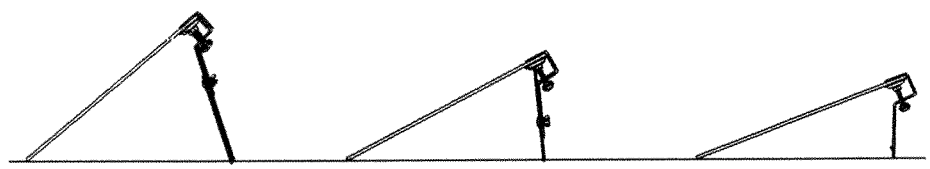
FIG. 13 is a side view illustration of FIG. 12.

Now referring to FIGS. 1-13, that will be discussed together, there are shown components of a portable adjustable easel method and apparatus used to support a rigid material. In an embodiment of the present invention, a top plate 14 may have a center slot cut 32, into the body of the top plate 14. Some embodiments may have a tab 24 at one end of the center slot 32 in the top plate 14, while other embodiments may not have a tab at one end of the center slot 32. The top plate 14 may be made from steel or other similar material. A hole 16 may be drilled approximately midway along the long-axis of the top plate 14.

After a bending process, the top plate 14 may be shaped with three curves and a fourth section may comprise the unbent remainder of the top plate 14. Accordingly, other embodiments may comprise a top plate 14 with sections of varying lengths. The center slot 32 cut into the top plate 14 may reside primarily in the fourth section while in the third section a hole 16 may be tapped into the top plate 14.

In an embodiment of the present invention, a bottom plate 26 may have a center slot 27 cut into the body of the bottom plate 26. The center slot 27 may extend in length the majority of the body of the bottom plate 26 yet may leave room at one end for product identification and the application of a protective coating 28. The bottom plate 26 may be shorter in overall length than the top plate 14. The bottom plate 26 may be made of steel or other similar material.

In an embodiment of the present invention, the top plate 14 and bottom plate 26 may be sandblasted, powder coated or painted before applying a protective coating 28 to the end of the bottom plate 26.

In an embodiment of the present invention, when assembled, the bent top plate 14 may be connected to the bottom plate 26 by using fasteners to connect the two together. By way of example, the top plate 14 and bottom plate 26 may be connected together by inserting a carriage bolt 30 into the slot 27 cut into the bottom plate 26 and extending through the slot 32 of the top plate 14 in the fourth section. A flat washer 22 may be positioned against the top plate 14 and a wing nut 20 may be threaded onto the carriage bolt 30 to secure the top plate 14 and bottom plate 26 together. The wing nut 20 may be loosened from the carriage bolt 30 to allow lengthening or shortening of the bottom plate 26 to attain desired length. Upon reaching desired length, the wing nut 20 should be tightened firmly to the flat washer 22 and carriage bolt 30.

In an embodiment of the present invention, components may be connected to form a clamping attachment that secures a rigid material to the invention. The clamping attachment may be comprised of a thumbscrew 18, lock nut 38, cupped washer 36, and a cotter key 34. The thumbscrew 18 may be inserted into the hole 16 drilled into the top plate 14 in its third section, the lock nut 38 may be threaded onto the thumbscrew 18, and the cupped washer 36 may be fit onto the thumbscrew 18 and rest against the lock nut 38. A hole 40 may be drilled into the end of the thumbscrew 18 into which the cotter key 34 may be inserted to hold the cupped washer 36 in place.

It is to be understood that the form of the method and apparatus described herein is to be taken as preferred examples of the same and that various changes in the shape, size and arrangement of parts may be resorted to without departing from the spirit of the invention.

The above detailed description sets forth rather broadly the more important features of the present invention in order that its contributions to the art may be better appreciated.

Those skilled in the art will appreciate that the conception, upon which disclosure is based, may readily be utilized as a basis for designing other structures, methods, and systems for carrying out the purpose of the present invention. It is important, therefore, that this Description be regarded as including such equivalent constructions insofar as they do not depart from the spirit and scope of the present invention.

Although certain example methods, apparatus and articles of manufacture have been described herein, the scope of coverage of this patent application is not limited thereto. On the contrary, this patent application covers all methods, apparatus and articles of manufacture fairly falling within the scope of the invention either literally or under the doctrine of equivalents.

To the extent the above specification describes example components and functions with reference to particular compliance requirements, standards and/or protocols, it is understood that the teachings of this disclosure are not limited to such compliance requirements, standards and/or protocols. Such compliance requirements, standards and/or protocols are periodically superseded or revised by newer versions. Accordingly, replacement compliance requirements, standards and/or protocols having the same general functions are equivalents which are intended to be included within the scope of this Description.

Therefore, the foregoing is considered as illustrative only of the principles of the present invention. Further, since numerous modifications and changes will readily occur to those skilled in the art, it is not desired to limit the present invention to the exact construction and operation described, and accordingly, all suitable modifications and equivalents may be resorted to, falling within the scope of the present invention. While the above Description describes various embodiments, it will be clear that the present invention may be otherwise easily adapted to fit any configuration as desired or required.

As various changes could be made in the above embodiments without departing from the scope of the invention, it is intended that all matter contained in the above Description shall be interpreted as illustrative and not in a limiting sense.

What is claimed:

1. An adjustable easel system comprising of two support posts forming a top plate and bottom plate, respectively, which become a pair of generally parallel legs with adjustable clamping components and fasteners; said clamping components at a top plate bend of each post includes a thumbscrew that holds a lock nut washer, a cupped washer, and a cotter key; by tightening the thumbscrew through a threaded opening in the top plate and moving the cupped washer toward an ending bend of the top plate forming a decreased space capable of securing a rigid material; said adjustable clamping components can accommodate varying thicknesses of rigid material; the top plate bend includes square bends accommodating the clamping components such that cannot be removed; the fasteners on the straight surfaces of the top and bottom plates are a carriage bolt, a washer, and a wing nut; each of the opening slots in the top and bottom plates accommodate the fasteners and keep the legs in place when the desired length is set; by loosening the wing nut, the carriage bolt and washer can lengthen or shorten the legs of the support posts; after tightening the wing nuts the two support posts in tandem become stable to support the rigid material work surface at a slant.

2. The easel system of claim 1, whereby fitting a rigid material, a board, or acrylic sheet between the damping components at the top plate bend of each support post; tightening the clamping components, then standing the two assembled support posts and rigid material at its bottom marginal edge on a solid surface thereby yielding a slanted surface for art composition.

3. The easel system of claim 2, wherein the rigid material at the bottom marginal edge and support posts are placed on a solid surface the easel system has enhanced stability when the bottom plate extended edge of the posts have been treated with a non-skid product and serve to constrain the formed easel against both sliding movement and pivotal movement when resting on a solid surface.

4. The easel system of claim 2, wherein the combined rigid material and two support posts further adjustable in slant by loosening the fasteners holding the top and bottom plates on each post and sliding the bottom plate up or down, then retightening the fasteners, creating a custom slant.

5. The easel system of claim 4, whereby varying the degree of slant by loosening said fastener within the opening slots holding the top plate and bottom plate together and removing the bottom plate to position such that each post is moved to a lesser degree of slant.

6. The easel system of claim 2, wherein the easel accommodates a variety of sizes of the rigid material.

7. The easel system of claim 1, wherein during non-use the easel can be knocked down or collapsed to a pocket size to facilitate storage, packing and transporting.

* * * * *